(12) United States Patent
Briese

(10) Patent No.: US 8,157,397 B2
(45) Date of Patent: Apr. 17, 2012

(54) FOLDABLE REFLECTOR SCREEN

(76) Inventor: Hans-Werner Friedrich Briese, Hamburg (DE)

( * ) Notice: Subject to any disclaimer, the term of this patent is extended or adjusted under 35 U.S.C. 154(b) by 120 days.

(21) Appl. No.: 12/666,496

(22) PCT Filed: Jun. 25, 2008

(86) PCT No.: PCT/EP2008/005435
§ 371 (c)(1),
(2), (4) Date: Dec. 23, 2009

(87) PCT Pub. No.: WO2009/003705
PCT Pub. Date: Jan. 8, 2009

(65) Prior Publication Data
US 2010/0177520 A1 Jul. 15, 2010

(30) Foreign Application Priority Data
Jun. 29, 2007 (DE) .................. 10 2007 031 135

(51) Int. Cl.
G03B 15/02 (2006.01)
F21V 7/22 (2006.01)
F21V 7/09 (2006.01)

(52) U.S. Cl. ............... 362/18; 362/296.02; 362/278; 362/320; 362/346

(58) Field of Classification Search .......... 362/16–18, 362/296.02, 278, 320, 346, 358, 418
See application file for complete search history.

(56) References Cited

U.S. PATENT DOCUMENTS

| | | | |
|---|---|---|---|
| 3,851,164 A | 11/1974 | Intrator | |
| 6,176,598 B1 * | 1/2001 | Seligman et al. | 362/352 |
| 6,582,101 B2 * | 6/2003 | Sara et al. | 362/297 |
| 7,086,746 B2 * | 8/2006 | Regester | 362/18 |
| 7,416,316 B2 * | 8/2008 | O'Brien et al. | 362/382 |
| 7,452,111 B2 * | 11/2008 | Mazzei | 362/346 |
| 2006/0152925 A1 | 7/2006 | Raby et al. | |

FOREIGN PATENT DOCUMENTS

| | | |
|---|---|---|
| DE | 2 203 786 | 8/1973 |
| DE | 196 18 434 C1 | 11/1997 |
| DE | 20 2004 011140 U1 | 9/2004 |
| JP | 10-111405 | 4/1998 |

OTHER PUBLICATIONS

International Search Report and Written Action from the International Search Office of PCT/EP2008/005435 dated Aug. 28, 2008 with English translation.
European Office Action Dated May 7, 2010 W/ English Translation.
Korean Office Action dated Nov. 22, 2011 along with an English translation.

* cited by examiner

*Primary Examiner* — Peggy A. Neils
(74) *Attorney, Agent, or Firm* — Venable LLP; Robert Kinberg

(57) ABSTRACT

A foldable reflector screen includes a flexible, cloth-like reflective element having an inside and an outside, a supporting and tensioning structure arranged to support the reflective element on the outside, and a carrier element including at least one lamp and mounting the supporting and tensioning structure. The reflector screen has an open state in which the reflective element forms an essentially rotationally symmetrical body having an axis of rotation and has a light outlet opening. The reflective element comprises at least two reflective sections. The two reflective sections have in each case a different geometrical shape in a section containing the axis of rotation of the reflective element.

12 Claims, 2 Drawing Sheets

FOLDABLE REFLECTOR SCREEN

CROSS-REFERENCE TO RELATED APPLICATIONS

This application is a 35 U.S.C. §371 filing of International Patent Application No. PCT/EP2008/005435 filed Jun. 25, 2008, designating the United States and claiming the benefit of German Application No. 10 2007 031 135.6 filed Jun. 29, 2007.

FIELD OF THE INVENTION

The invention concerns a foldable reflector screen, comprising a flexible, cloth-like reflective element having a supporting and tensioning structure on the outside as well as a carrier element having at least one lamp, the reflective element in the opened-up state of the reflector screen forming an essentially rotationally symmetrical body having a light outlet opening.

Reflector screens of this kind are used in particular in the field of photography or film. By means of the reflector screens, preferably different light and/or shadow effects and images are produced or formed, that is, different image characteristics. But the reflector screens can also be used for the illumination of rooms, for selectively lighting an object or the like. It is precisely in the field of photography and film that there is the requirement that mobile reflector screens on the one hand are light for purposes of transport and on the other hand have a low transport volume. It is only at the point of use that the "umbrella-like" reflector screen can then be opened up to its full size.

Reflector screens having the features mentioned hereinbefore are known, in which the reflective element in the opened-up state of the reflector screen corresponds either to a parabola or an ellipse or other common form in a section containing the centre axis of the carrier element. Document DE 196 18 434 C2 is mentioned as an example. In this, the reflective element in the opened-up state is an elliptical body in section. These reflector screens, which each correspond to only one geometrical shape in the section containing the centre axis, do however have the drawback that they are limited in the number of possible designs. In other words, the known reflectors in each section running parallel to the centre axis show the same geometrical curve, for example a parabola, elliptical or nearly elliptical shape or the like. This means that each geometrical shape of a body of revolution allows only one particular reflection of the light rays. Usually several reflectors are necessary for the superposition of several reflective areas. The cost of this is considerable.

BACKGROUND OF THE INVENTION

It is therefore the object of the present invention to propose a lightweight, easy-to-handle reflector screen with a wider field of application.

This object is achieved by a reflector screen of the kind mentioned hereinbefore by the fact that the reflective element is composed of at least two reflective sections, the two reflective sections each having a different geometrical shape in a section containing the axis of rotation of the reflector screen. The "section containing the axis of rotation" means a section parallel to the centre axis or axis of rotation, as shown in the figures. This means that the covering described or formed by the reflective element in section describes a curve which is composed of different geometrical curve sections. Due to this embodiment according to the invention, it is possible with a single reflector screen to combine or mix the reflective properties of several geometrical bodies.

An appropriate embodiment of the invention provides that the two reflective sections are located one behind the other in relation to the axis of rotation or centre axis of the reflector screen. This guarantees diverse adjustment of the light and shadow effects with easy handling.

Advantageously, one reflective section in the opened-up state of the reflector screen corresponds to an ellipse in section, and the other reflective section corresponds to a parabola in section, in which case it goes without saying that the geometrical bodies or curve sections are also encompassed in approximate form. By this means the essential reflections or light ray paths can be obtained, so that additional reflector screens etc. can be dispensed with.

A preferred development of the invention is distinguished in that, in addition to the supporting and tensioning structure, there is provided a further tensioning means which is designed and arranged in such a way that one of the reflective sections can be subjected to an additional tensioning force. By means of the supporting and tensioning structure, which usually has individual spokes, the shape of an ellipse or a nearly elliptical shape can be presented. However, to produce a parabola, considerable greater bending of the spokes is necessary, which is not economical with the traditional materials. Due to the additional tensioning means, shaping the reflective element into a parabola is particularly appropriate and cheap.

Preferably, between the parabolic reflective section and the spokes of the supporting and tensioning structure are arranged tensioning elements. By allocation of the tensioning elements to the spokes and the associated distribution of tensioning elements round the circumference of the body of revolution, particularly precise shaping of the reflective section is ensured. To put it another way, in spite of the great curvature of the parabolic reflective section, uniform tensioning without creases is ensured.

A particularly appropriate embodiment of the invention is characterised in that the tensioning elements are each composed of fabric elements that can be stretched essentially perpendicularly to the reflective element. In addition to a very lightweight and therefore particularly easy-to-handle design of the tensioning elements, uniform application of the tensioning force over a long distance is guaranteed as well.

BRIEF DESCRIPTION OF THE DRAWINGS

Further appropriate or advantageous characteristics and embodiments are apparent from the subsidiary claims and the description. A particularly preferred embodiment is described in more detail with the aid of the attached drawings. The drawings show:

DETAILED DESCRIPTION OF THE EMBODIMENTS

The reflector screens described below serve in particular to produce light and/or shadow effects in the field of photography and film. Naturally, the reflector screen can also be used in other fields.

Figure 1:
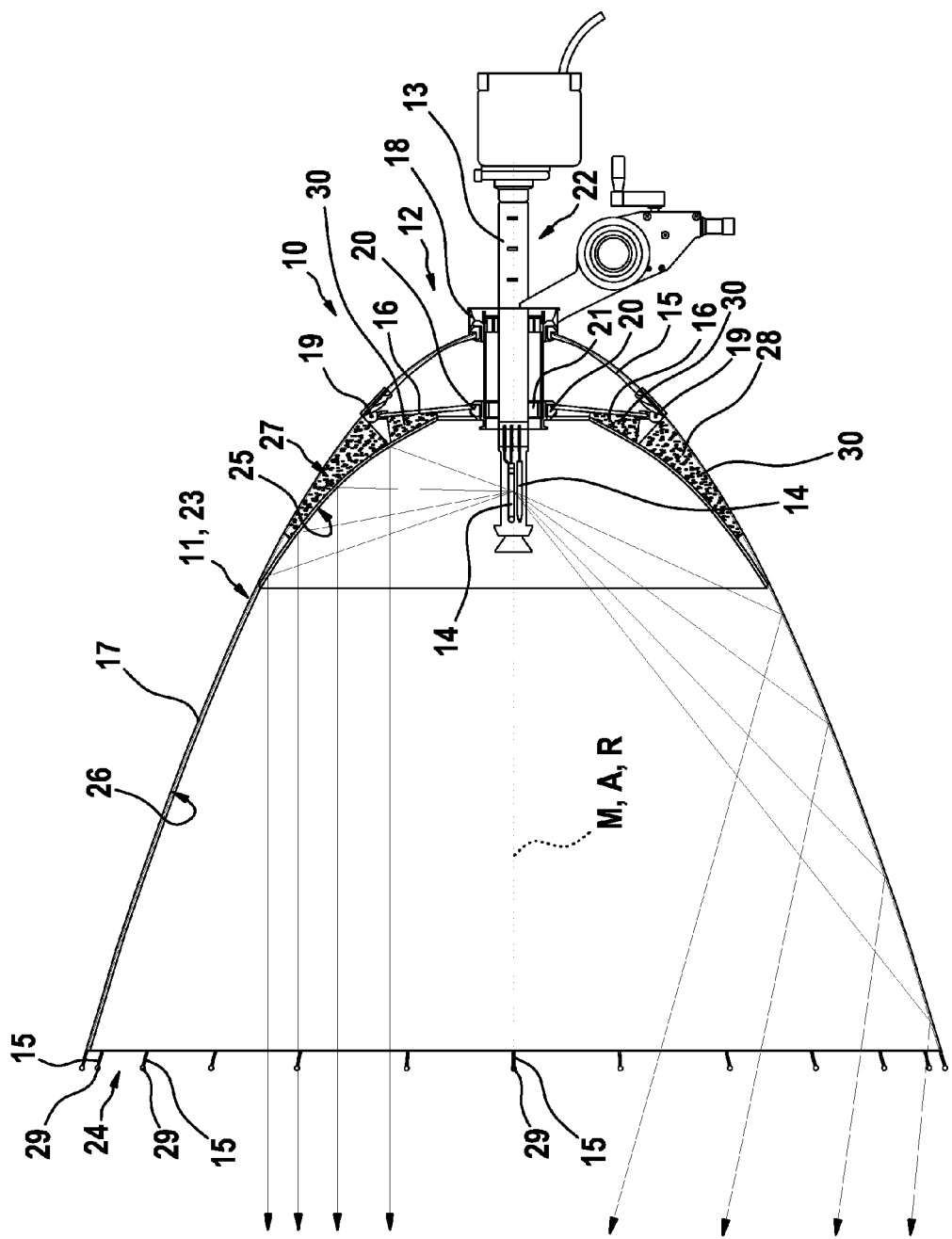
FIG. 1 a schematic side view of a reflector screen having a single-part reflective element, and FIG. 2 a schematic side view of a reflector screen having a two-part reflective element.

The reflector screen 10 according to FIG. 1 is designed as a foldable reflector screen 10 and comprises a reflective element 11, a supporting and tensioning structure 12 and a carrier element 13 having at least one lamp 14. The reflective element 11 is made of a flexible material such that it can be changed from a collapsed state to an opened-up state and back. For supporting and tensioning the cloth-like reflective element 11, there is provided the supporting and tensioning structure 12 which is arranged on the outside. This means that all components of the supporting and tensioning structure 12 are located outside the reflective surface of the reflective element 11, which is formed on the inside. To be more precise, the supporting and tensioning structure 12 has screen spokes 15 and expanding spokes 16. The screen spokes 15 are inserted in external seams 17 of the reflective element 11 and, in the region of a bearing body 18, hinged to the latter. The screen spokes 15 have expanding joints 19 at a short distance from their points of attachment to the bearing body 18. The screen spokes 15 can, in the region of a light outlet opening 24 which is described below, project beyond the reflective element 11 (see FIG. 1) or end with the reflective element 11 (see FIG. 2). At the projecting ends of the screen spokes 15, optionally e.g. spherical end pieces 29 or the like can be arranged. The expanding spokes 16 are connected to the screen spokes 15 in the region of the expanding joints 19. The other end of the expanding spokes 16 is mounted on corresponding knuckle joints 20 or the like. The knuckle joints 20 in turn are arranged on an annular sliding element 21. This construction and the principle of operation are basically known, e.g. from the above-mentioned DE 196 18 434 C2. Naturally, the supporting and tensioning structure can also be constructed in any other common way.

The carrier element 13 with a lamp 14 or several lamps 14, which can be arranged one behind the other or offset from each other, can be designed as a rigid element or as a focusing unit 22, as shown in the preferred embodiment. The focusing unit 22 for the or each lamp 14 is designed in such a way that the carrier element 13 is axially displaceable in the direction of the centre axis M of the reflector screen 10 relative to the latter. According to the position of the carrier element 13 within the reflective element 11, the paths of the reflected light rays change. In FIG. 1 which is shown, the paths of the reflected light rays are therefore shown only by way of example for one position of the carrier element 13.

The reflective element 11 forms in the opened-up state an essentially rotationally symmetrical body 23 about the axis of rotation R, which in the embodiment shown corresponds to the centre axis M. The reflective element 11 has on the side facing away from the carrier element 13 a light outlet opening 24. In the embodiment shown, the lamp 14 is located with its optical axis A directly on the centre axis M. The two axes A and M may, however, be offset from each other. The reflective element 11 which forms or describes the body 23 widens from an origin, in which the carrier element 13 is introduced into the reflective element 11, to the light outlet opening 24. The origin is defined as "at the back", while the light outlet opening 24 is defined as "at the front".

The reflective element 11, which preferably consists of a single-piece blank (see FIG. 1), but in other embodiments (see e.g. FIG. 2) may also be designed in several parts or assembled from several component parts, is composed of at least two reflective sections 25 and 26. Alternatively, the reflective element 11 can also be composed of more than two reflective sections. To put it another way, the reflective element 11 is designed or shaped in such a way that two or more reflective sections 25, 26 of different geometrical shape exist. The two reflective sections 25, 26 each have a different geometrical shape in a section containing the axis of rotation R of the reflector screen 10. This means that light rays impinging on the reflective element 11 from the lamp 14 are reflected differently in one reflective section 25 than in the other reflective section 26.

The two reflective sections 25, 26 are located one behind the other in relation to the centre axis M or axis of rotation R of the reflector screen 10. To put it another way, the light rays in a rear region of the reflector element 11 impinge on a first reflective section 25 with a first geometrical shape in section, and in a front region of the reflector element 11 on a second reflective section 26 with a second geometrical shape in section. One of the reflective sections 25 or 26 in the opened-up state of the reflector screen 10 corresponds in section to an ellipse, while the other reflective section 26 or 25 corresponds in section to a parabola. Naturally, the reflective sections 25, 26 can also describe other geometrical shapes in section. In the embodiment shown, the parabolic reflective section 25 is located at the rear in the region of the carrier element 13. Starting from the carrier element 13, the elliptical reflective section 26 is located behind the parabolic reflective section 25 at the front in the region of the light outlet opening 24.

As already described, the reflective element 11 is basically tensioned by the supporting and tensioning structure 12. However, the screen spokes 15 abut closely against the reflective element 11 only in the region of the front, elliptical reflective section 26 in the seams 17. In the region of the rear, parabolic reflective section 25, the screen spokes 15 run at a distance from the reflective element 11. To tension the reflective section 25 which is not directly tensioned with the screen spokes 15, in addition to the supporting and tensioning structure 12 there is provided a further tensioning means 27 which is designed and arranged in such a way that one of the two reflective sections 25, 26, in the present case the parabolic rear reflective section 25, can be subjected to an additional tensioning force. Concretely, this means that with the additional tensioning means 27 different geometrical shapes in section can be produced from a single-piece section. In other words, the tensioning means 27 is suitable for changing the cloth-like reflective element 11 at least partially to a shape differing from the shape described by the screen spokes 15.

As already mentioned, between the rear, parabolic reflective section 25 and the screen spokes 15 is formed a gap in which tensioning elements 28 are arranged. To be more precise, several tensioning elements 28 form the tensioning means, the number of tensioning elements 28 preferably corresponding to the number of screen spokes 15. Naturally, the number of both the tensioning elements 28 and the screen spokes 15 can vary. In the embodiment shown in FIG. 1, each tensioning element 28 is composed of two tensioning lugs 30. The design of the tensioning elements 28 may, however, vary likewise. The design of the tensioning elements 28 can be diverse. Preferably, tensioning elements 28 are constructed and designed in such a way that they are extendable in one direction and not extendable in other directions. By this means, a tensioning force can be transmitted particularly effectively to the reflective element 11 and in particular to the rear, parabolic reflective section 25. The direction of extension extends essentially perpendicularly to the surface of the tensioned reflective element 11. Here, fabric elements with the above-mentioned properties proved to be particularly preferred because, in addition to the uniform application of tensioning force, they are very lightweight. Optionally, other tensioning means may be provided, in particular also sheets or the like.

The fabric elements are, on the side facing towards the reflective element 11, attached rigidly to the latter e.g. by stitching, and on the other side to the respectively associated screen spokes 15 of the supporting and tensioning structure 12. Attachment to the reflective element 11 is linear, such that the fabric elements in extension of the seams 17 run along the circumference of the reflective element 11. The fabric elements are for example also, as it were, suspended on the screen spokes 15 by a seam or by pegging out or the like. The tensioning force of the tensioning means 27 of each individual tensioning element 28 is adjustable by shortening the distance between the screen spoke 15 and the reflective section 25.

The reflective element 11 itself is structured on its inner side facing towards the lamp 14. It is preferably made of a metal foil or a carrier fabric to which is laminated a plastic film, for example made of polyester, to which aluminium or the like is applied by vapour deposition. Other materials or combinations of materials or coatings are possible too.

If the two basic geometrical shapes of the reflective sections 25, 26 are considered, their origins or apices $S_p$ are located at a distance from each other. The distance can vary and even be reduced to zero. To put it another way, the two reflective sections 25, 26 may also be shaped in such a way that the apices $S_p$ of the geometrical bodies formed by the reflective sections 25, 26, ellipse and parabola, are located one above the other at a common apex $S_p$. Preferably, however, there is an offset in the direction of the centre axis M.

Figure 2:
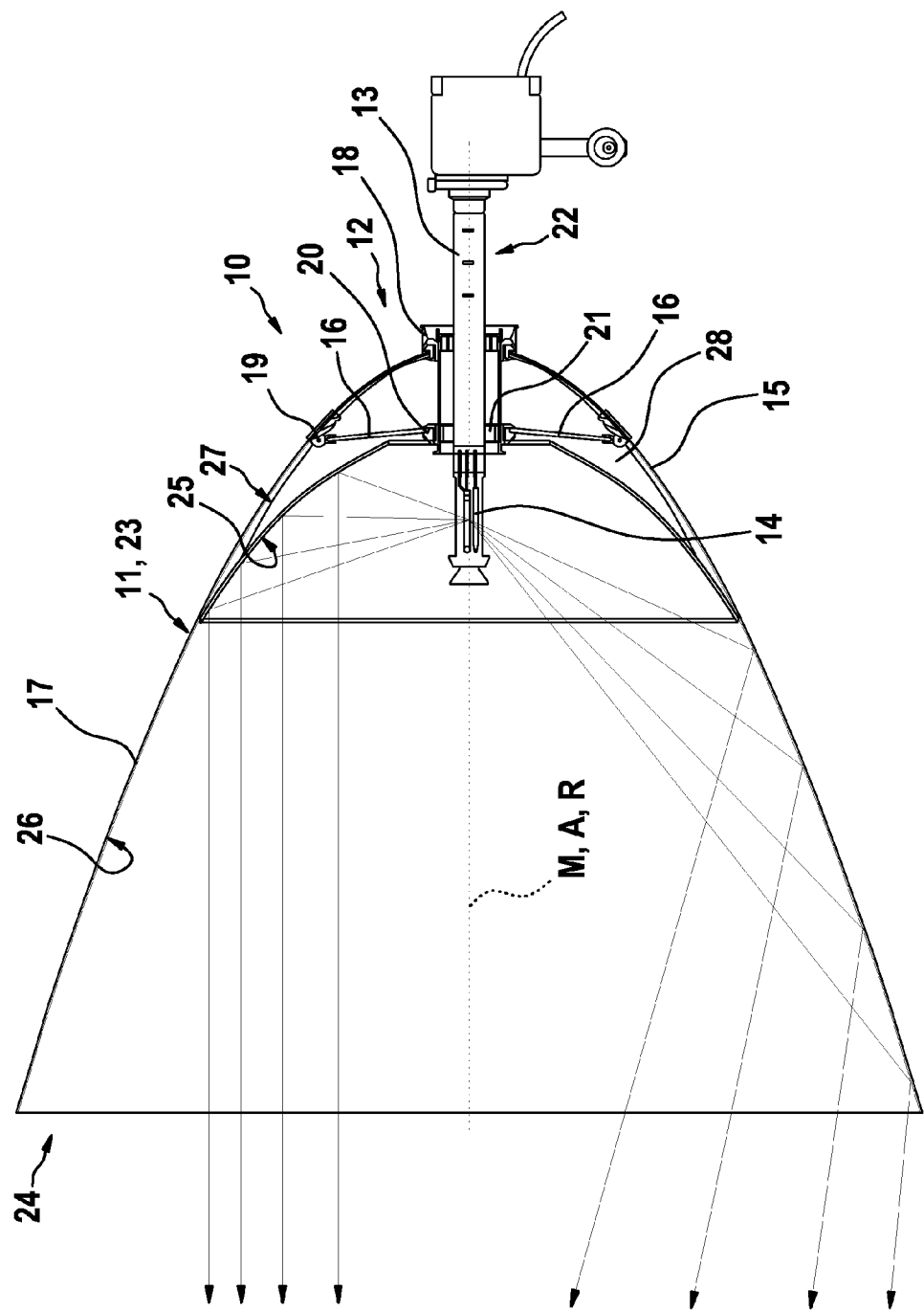

In a further embodiment as in FIG. 2, the reflective element 11 is divided. There are two separate reflective sections 25, 26, the rear, parabolic reflective section 25 being arranged within the front, elliptical reflective section 26. Otherwise the construction is according to the embodiment described above.

The invention claimed is:

1. A foldable reflector screen, comprising:
   a flexible, cloth-like reflective element having an inside and an outside;
   a supporting and tensioning structure arranged to support the reflective element on the outside;
   a carrier element including at least one lamp and mounting the supporting and tensioning structure; and
   a further tensioning device adapted and arranged so that one of the reflective sections is subjected to an additional tensioning force;
   wherein the reflector screen has an open state in which the reflective element forms an essentially rotationally symmetrical body having an axis of rotation and has a light outlet opening, and wherein the reflective element comprises at least two reflective sections, the two reflective sections having in each case a different geometrical shape in a section containing the axis of rotation of the reflective element,
   wherein one of the reflective sections in the open state of the reflector screen corresponds to an ellipse in section, and the other one of the reflective sections corresponds to a parabola in section, and wherein the supporting and tensioning structure includes screen spokes that abut closely against the reflective element in a region of the elliptical reflective section, and in a region of the parabolic reflective section run at a distance from the parabolic reflective section.

2. The reflector screen according to claim 1, wherein the two reflective sections are located one behind the other in relation to the axis of rotation of the reflective element.

3. The reflector screen according to claim 1, wherein the reflective section which is elliptical in section is located behind the parabolic reflective section in the direction of the light outlet opening of the reflective element.

4. The reflector screen according to claim 1, wherein the reflective element comprises a single-piece section.

5. The reflector screen according to claim 1, wherein the further tensioning device comprises tensioning elements arranged between the parabolic reflective section and the screen spokes of the supporting and tensioning structure.

6. The reflector screen according to claim 5, wherein the tensioning elements are constructed so that they are extendable in one direction and not extendable in other directions.

7. The reflector screen according to claim 5, wherein the tensioning elements are each comprised of fabric elements that can be stretched essentially perpendicularly to the surface of the tensioned reflective element.

8. The reflector screen according to claim 7, wherein the fabric elements on the side facing towards the reflective element are rigidly connected to the reflective element and on the other side are attached to the respectively associated screen spokes of the supporting and tensioning structure.

9. The reflector screen according to claim 1, wherein the further tensioning device is adjustable to adjust a tensioning force.

10. The reflector screen according to claim 1, wherein the reflective element is structured on the inside facing towards the lamp.

11. The reflector screen according to claim 1, wherein the cloth-like reflective element comprises a carrier fabric, and the reflector screen further includes a plastic film laminated to the carrier fabric and aluminium vapour is deposited on the plastic film.

12. The reflector screen according to claim 1, wherein the carrier element comprises a focusing unit for each of the at least one lamp and wherein the carrier element is axially displaceable in the direction of the rotational axis of the reflective element.

* * * * *